UNITED STATES PATENT OFFICE.

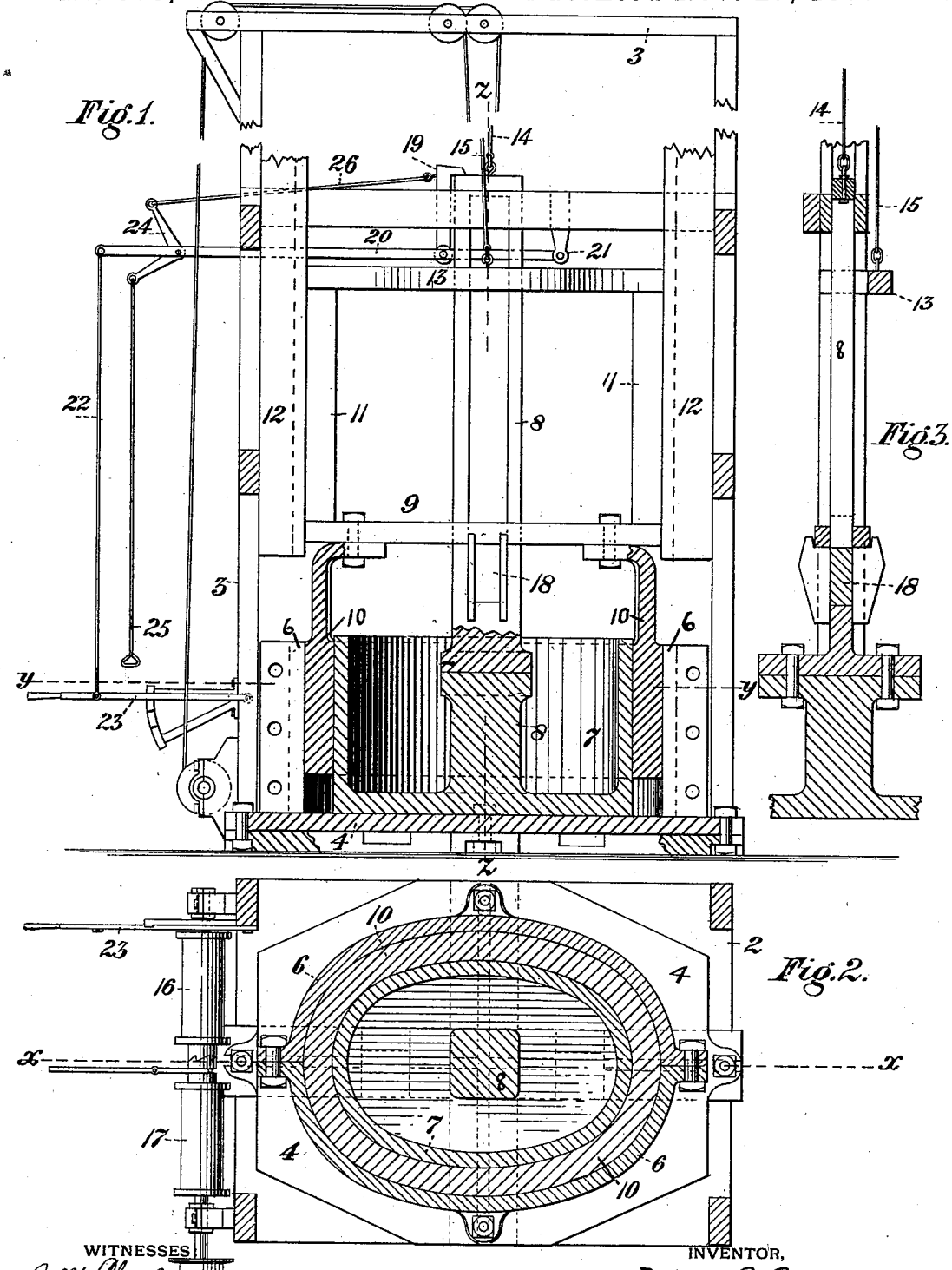

FREDERICK R. REED, OF PITTSBURG, PENNSYLVANIA, ASSIGNOR OF ONE-FOURTH TO MICHAEL M. O'CONNELL, OF SAME PLACE.

POTTERY-MACHINE.

SPECIFICATION forming part of Letters Patent No. 393,452, dated November 27, 1888.

Application filed January 3, 1888. Serial No. 259,657. (No model.)

*To all whom it may concern:*

Be it known that I, FREDERICK R. REED, of the city of Pittsburg, in the county of Allegheny and State of Pennsylvania, have invented a new and useful Improvement in Machines for Making Glass-House Pots; and I do hereby declare the following to be a full, clear, and exact description thereof, reference being had to the accompanying drawings, forming a part of this specification, in which—

Figure 1 is a sectional elevation of the machine on the line *x x* of Fig. 2. Fig. 2 is a cross-section on the line *y y* of Fig. 1. Fig. 3 is a vertical section on the line *z z* of Fig. 1.

Like symbols of reference indicate like parts in each.

My invention relates to an improvement in machines for making clay pots for use in melting glass. Heretofore these pots have been commonly made by hand, the workman building them up with clay in a slow and laborious manner, the consequence being that the cost of manufacture is very large, and the articles themselves are subject to all the disadvantages which result from the use of the labor of men of varying intelligence and skill. Another serious disadvantage in the manufacture of these pots by hand is that in order that the workmen may be able to handle the clay with a reasonable degree of ease it has to be very watery and thin, and the pot when finished takes an unduly long time to become sufficiently dry to be fit for use. Although I am not the first to devise a machine for this purpose, the machines which have been heretofore suggested have had so many defects that they have not come into general use.

The object of my invention is to provide a machine which shall not possess these defects, but which shall cheapen the cost of production and improve the quality of the finished pots.

Referring now to the drawings, 2 is the bed of the machine, on which is built an upright derrick or frame, 3. On the bed 2 is the board or base 4, on which the pot is made, and set on the base 4 is a hollow mold, 6, whose interior shape is that of the pot, and which is adjusted or centered in position by means of bolts which work in radial slots in the base 4 and in grooved ways below the base. This mold I prefer to make in two parts, joined together at their ends by bolts and flanges. Within this mold is a core or rammer, 7, whose external shape is exactly that of the interior of the pot desired to be made, so that when the core is arranged properly within the mold there is a space between it and the inside walls of the mold of the width of the thickness of the side of the pot. This rammer has an upwardly-extending stem, 8, which works in a guide in a cross-timber, 9, of the frame or derrick, so that it may be moved vertically therein. In the space between the rammer and the mold is a second hollow rammer or shell, 10, which is of the same shape as the recess and nearly of the same thickness. This rammer is attached to a vertical frame, 11, which is arranged to slide up and down between guideways or slide-pieces 12 of the derrick, and which preferably has a cross piece or yoke, 13, slotted so as to fit around and to move loosely on the vertical stem 8 of the core or rammer. To the vertical stem 8 of the core 7 and to the frame 11 of the outer rammer, 10, are attached chains or ropes 14 and 15, which pass over sheaves at the top of the machine-derrick, and thence extend down to rotary drums 16 and 17, which are driven by a suitable engine, and are arranged in like manner with the drums of a common gravity pile-driver, so that they may be put in gear with the engine and caused to wind up their ropes, and then disconnected from the engine, so that the ropes may be allowed to unwind therefrom, and that the rammer attached to the ropes may drop.

The operation of the machine is as follows: After the mold has been adjusted in proper position, the workman puts a quantity of clay thereinto, and after the annular rammer 10 has been lifted and held above the level of the bottom of the core-rammer 7, by means of an interposed separating block or frame, 18, (see Figs. 1 and 3,) the drum 16 is thrown into gear and caused to wind up the cord 14, thus raising the core-rammer 7, and with it the annular rammer 10, up toward the top of the derrick. The core-rammer is then allowed to drop down upon the clay in the mold, and this action of dropping the core-rammer with additions of fresh clay is continued until a bottom of sufficient thickness for the pot has been compacted on the base 4. Then, in order to form the sides of the pot, the separating-block 18 is removed, and the core-rammer 7 is allowed to rest on the clay on the bottom of the mold. Clay is then placed in the recess between the core and the outside mold, and by means of the drum 17 and rope 15 the annular rammer 10 is raised and allowed to drop on the clay, fresh additions of which are made from time to time until the sides of the pot have been built to the desired height and firmly compacted. The core-rammer and the annular rammer are then raised out of the mold, the parts of the mold are taken apart and removed from the pot, which is carried away on the base 4 and allowed to dry. The base 4 is lifted by the usual pot-truck, the prongs of which are inserted beneath the base, the grooved ways below the base being cut away to permit passage of the prongs. If the pot is intended to be a closed pot for the manufacture of flint glass, the top is turned in in the usual way before it is set aside to dry.

When the sides of the pot are being formed, it is necessary that the core-rammer shall be held very tightly in position in the mold. As a convenient means for effecting this, I have provided a hooked bar, 19, whose hooked end is adapted to fit over the end of the vertical stem of the core-rammer. The lower end of this bar is pivotally connected with a lever, 20, fulcrumed to the derrick or frame of the machine at 21 and at the end connected by a rod, 22, to a hand-lever, 23. When the hooked end of the bar 19 is adjusted over the end of the stem of the core-rammer, it may be caused to press firmly upon the top of the stem by depressing the lever 23. In order to disengage the hook from the stem, I employ a bell-crank lever, 24, having a hand-pull, 25, and a connecting-rod, 26. These devices form a lock by which the core-rammer is held firmly in position at the base of the mold after the bottom of the pot has been compacted and before forming the sides. The effect of thus holding down the core is to prevent the clay forming the sides of the pot from being forced down under the core-rammer and spoiling the uniformity of the bottom.

The action of the machine is very accurate, and when the guides are properly constructed there is no danger that the core-rammer shall not strike the clay at the proper central position within the mold.

A pot can be made by this machine in very much less time than by the old process of hand manufacture, and the products of the machine will be exactly uniform. The pot will also be of better quality, and by reason of the fact that drier clay can be used than that which is necessary for hand-made pots the time taken in the drying process is lessened. The danger of breaking, which is always present when the pots are drying, is also very much diminished, because the clay, being drier, shrinks very much less than when in the wet state usual in the hand manufacture.

In order to prevent the clay from adhering to the core when the sides of the pot are being formed by the annular rammer, I propose to cover the core with a canvas or cloth bag after the bottom of the pot has been formed, so that when the core is being removed it will come easily out of the cloth, which can afterward be taken from the interior of the pot. I also intend to cover the base 4 with cloth or canvas, the purpose of this being to prevent the sticking of the clay and to enable the pot in shrinking to move freely on the base without cracking.

I do not desire to limit myself strictly to the precise form of the machine which I show and describe, since it is susceptible of very considerable modifications in form and details of construction without involving a departure from the substantial features of my invention.

So far as the combination of the annular rammer 10 and the interior core-rammer, 7, is concerned, I do not limit myself to the operation of these parts as drops, since they may be operated by the positive action of cranks, &c., for I believe myself, broadly speaking, to be the inventor of the combination of these parts however operated.

I claim—

1. In a machine for making clay pots, the combination, with a mold, of a reciprocating rammer which forms the bottom of the pot, and a separately-movable exterior rammer which forms the sides, said rammers being connected and moved together during the formation of the bottom, substantially as and for the purposes described.

2. In a machine for making clay pots, the combination, with a mold, of a central rammer, an outer rammer which works between the central rammer and the mold to form the sides of the pot, and a lock for the central rammer, substantially as and for the purposes described.

3. In a machine for making clay pots, the combination, with a mold, of a central reciprocating core-rammer and its stem or frame, an outer reciprocating rammer and its frame, and a supporting device, 18, by which the outer rammer is supported on and carried with the core-rammer in the reciprocations of the latter, substantially as and for the purposes described.

4. In a machine for making clay pots, the combination, with an outer mold, of a central rammer-core having a vertical stem, a hook adapted to engage said stem for securing the core after the bottom of the pot has been formed thereby, and a lever mechanism for operating said hook, substantially as and for the purposes specified.

5. In a machine for forming clay pots, the combination, with an outer mold, of a central gravity-rammer for forming the bottom of the pot, means for lifting the central rammer, and an independent gravity-rammer arranged between the central rammer and the mold for forming the sides of the pot, and means for lifting the independent gravity-rammer by the central rammer, substantially as and for the purposes specified.

In testimony whereof I have hereunto set my hand this 24th day of December, A. D. 1887.

FREDERICK R. REED.

Witnesses:
  JOS. H. JACOBS,
  J. K. SMITH.